(12) United States Patent
Rumell et al.

(10) Patent No.: US 7,192,469 B1
(45) Date of Patent: Mar. 20, 2007

(54) EXHAUST TREATMENT DEVICE, SYSTEM AND METHODS FOR INTERNAL COMBUSTION ENGINES

(76) Inventors: Demetrius A. Rumell, deceased, late of Bargersville, IN (US); by Joann Rumell, legal representative, 2501 N. 575 W., Bargersville, IN (US) 46106; Joseph J. Rumell, 2440 Foxcliff Est. North, Ramsgate Rd., Martinsville, IN (US) 46151; Fred A. VanDeVander, P.O. Box 6091, 9909 Cumberland Ridge La., Fishers, IN (US) 46037

( * ) Notice: Subject to any disclaimer, the term of this patent is extended or adjusted under 35 U.S.C. 154(b) by 0 days.

(21) Appl. No.: 10/884,123

(22) Filed: Jul. 2, 2004

(51) Int. Cl.
*F01N 3/02* (2006.01)
*B01D 47/02* (2006.01)

(52) U.S. Cl. .............. 96/245; 96/251; 96/253; 96/262; 96/329; 96/356; 96/367; 96/383; 55/DIG. 30; 60/310; 60/320

(58) Field of Classification Search .......... 96/245, 96/251, 253, 262, 278, 329, 356, 367, 383; 95/229; 55/DIG. 30; 165/154, 155; 60/310, 60/320
See application file for complete search history.

(56) References Cited

U.S. PATENT DOCUMENTS

| | | | | |
|---|---|---|---|---|
| 2,420,185 | A * | 5/1947 | Messmore | 208/41 |
| 2,612,745 | A * | 10/1952 | Veechio | 96/350 |
| 2,943,845 | A * | 7/1960 | Jaklitsch | 165/87 |
| 3,642,259 | A * | 2/1972 | Bowden | 96/136 |
| 3,700,029 | A * | 10/1972 | Thrun | 165/51 |
| 3,875,743 | A * | 4/1975 | Mercer | 60/275 |
| 3,957,467 | A * | 5/1976 | Kim | 96/353 |
| 4,210,176 | A * | 7/1980 | Emming | 137/573 |
| 4,300,924 | A * | 11/1981 | Coyle | 96/247 |
| 4,359,879 | A * | 11/1982 | Wright | 62/513 |
| 4,448,593 | A * | 5/1984 | Spiers | 96/245 |
| 4,628,689 | A * | 12/1986 | Jourdan | 60/295 |
| 5,251,603 | A * | 10/1993 | Watanabe et al. | 123/541 |

\* cited by examiner

Primary Examiner—Frank M. Lawrence
(74) Attorney, Agent, or Firm—Krieg DeVault LLP

(57) ABSTRACT

A device, system and methods related to the same are provided for the treatment of exhaust gases from internal combustion engines. An exhaust treatment device is provided comprising a chamber containing a liquid bath through which exhaust gases are directed for removing exhaust products from the exhaust gas. A thermal reducer is provided for reducing the temperature of the exhaust gas prior to entry into the exhaust gas treatment device, as desired. Further provided are related methods for removing carbon monoxide from exhaust gas, liquid hydrocarbon solutions for use as the liquid bath in the exhaust gas treatment device, and methods for preparing such liquid hydrocarbon bath solutions.

70 Claims, 5 Drawing Sheets

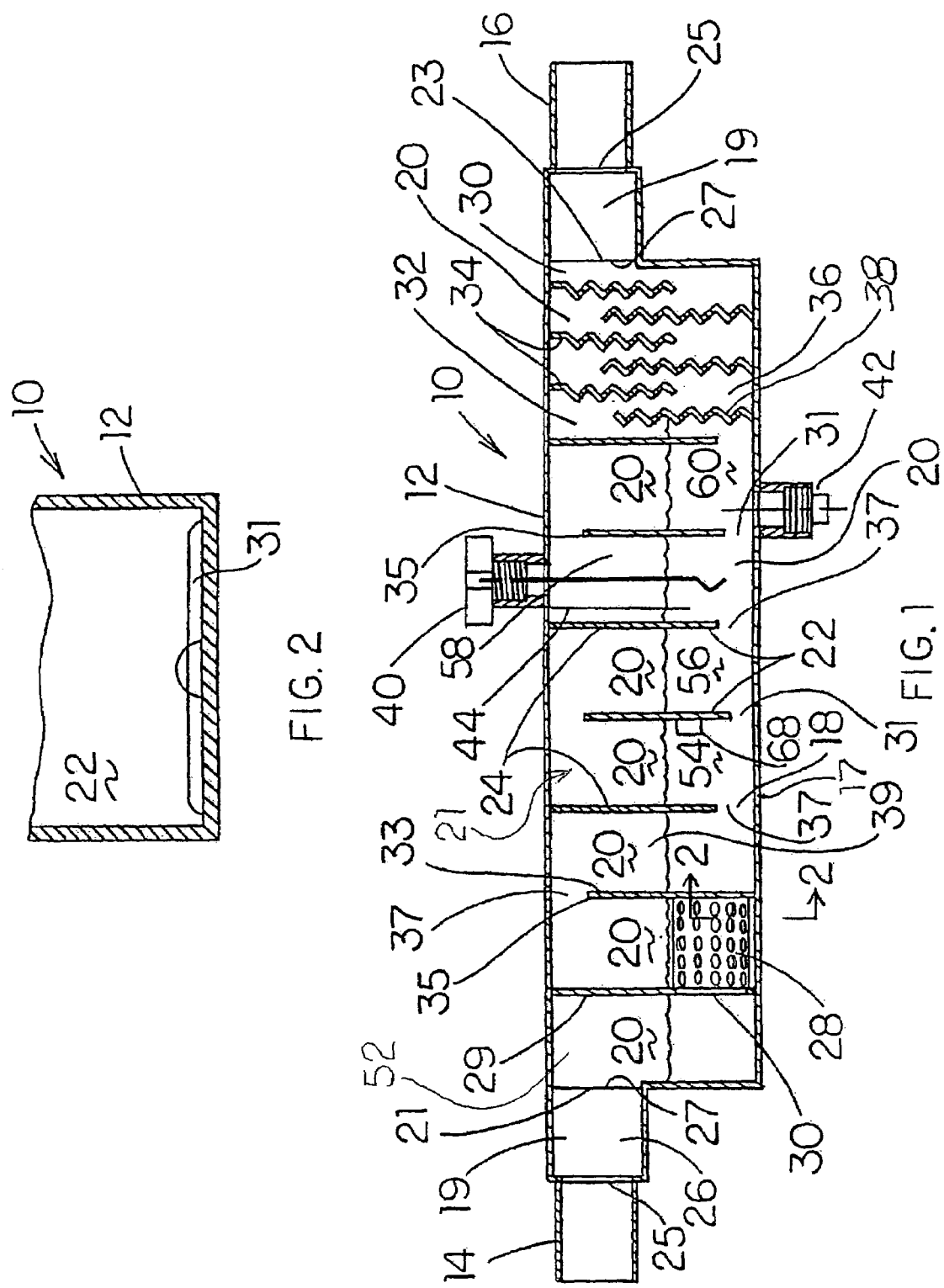

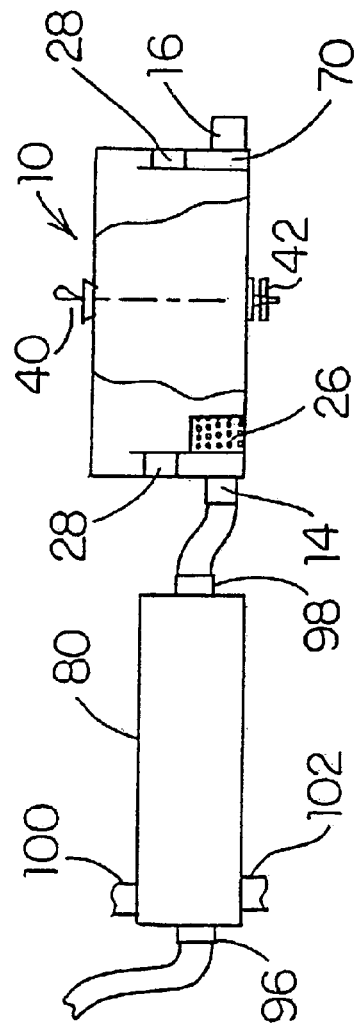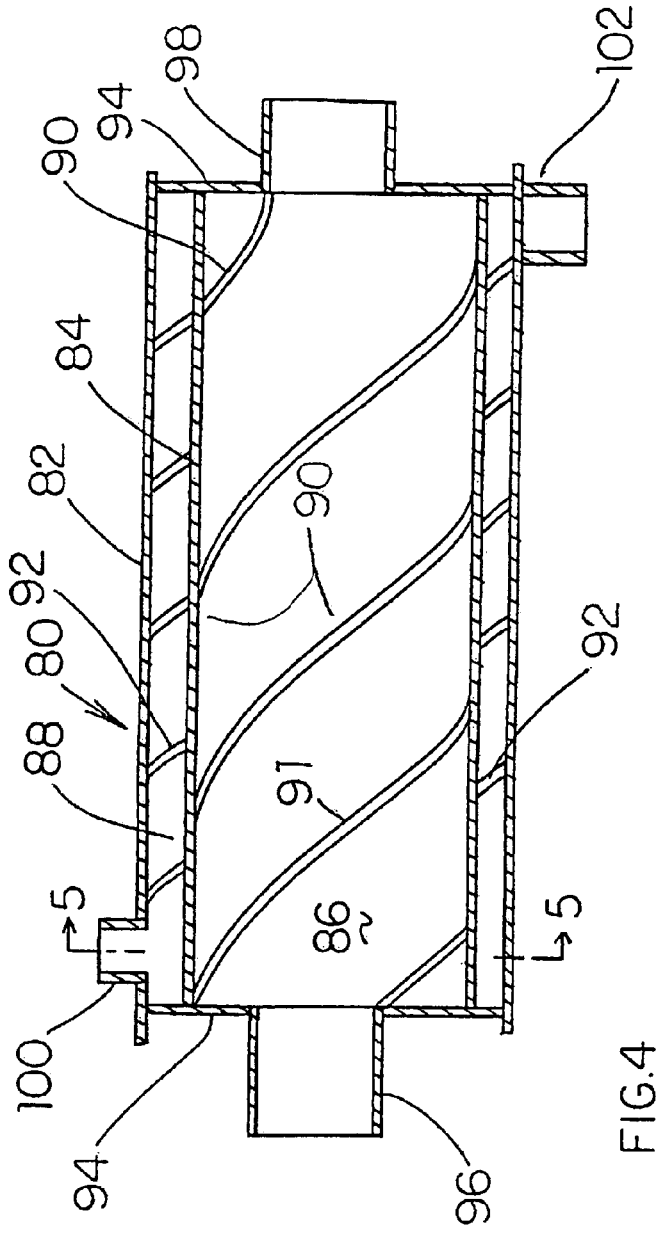

EXHAUST TREATMENT DEVICE, SYSTEM AND METHODS FOR INTERNAL COMBUSTION ENGINES

BRIEF DESCRIPTION OF THE DRAWINGS

FIG. 1 shows a side cross-sectional view of a version of an exhaust gas treatment device according to the present invention;

FIG. 2 shows a cross-sectional view along the line 2—2 from FIG. 1;

FIG. 3 shows a side view of a version of an exhaust gas treatment system according to the present invention comprising a thermal reducer fluidly connected to an exhaust gas treatment device;

FIG. 4 shows a side cross-sectional view of a version of a thermal reducer according to the present invention.

DETAILED DESCRIPTION OF EMBODIMENTS OF THE INVENTION

Figure 5:
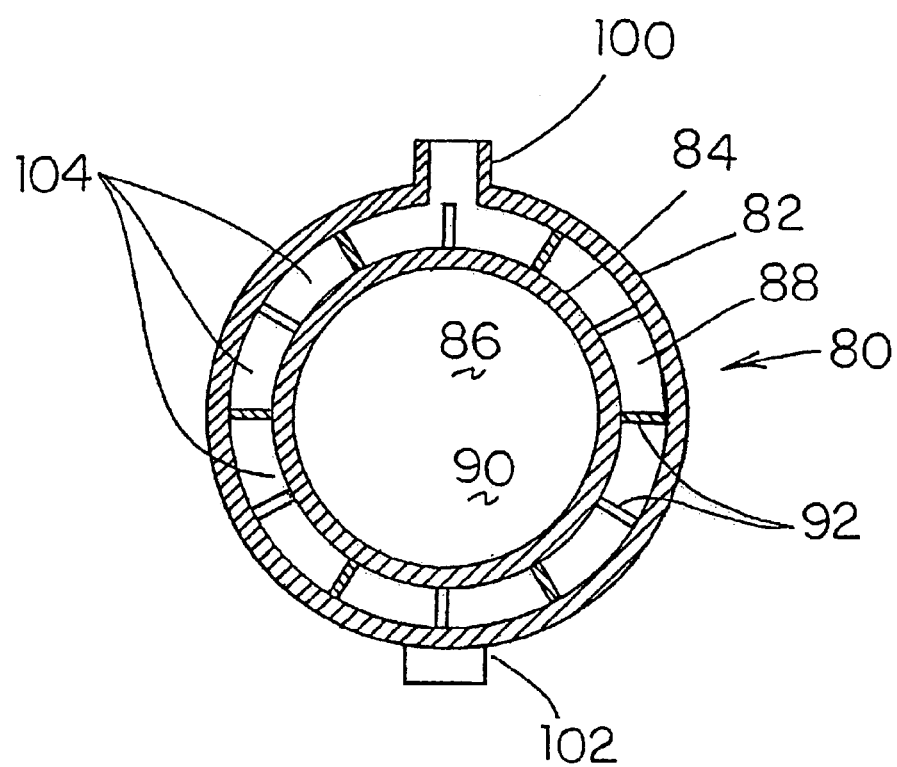
FIG. 5 shows a cross sectional view along the line 5—5 from FIG. 4 for a version of a coolant baffling system for a thermal reducer according to the present invention.

Although the disclosure hereof is detailed and exact in order to enable those skilled in the art to practice the invention, the physical versions herein disclosed merely exemplify the invention which may be embodied in other specific structure. The scope of the invention is defined in the claims appended hereto.

In the drawings, various versions are shown of the device 10 for treating exhaust gases, such as stock gases from power plants and other commercial establishments and from internal combustion engines. Also shown are versions of a thermal reducer 80 to cool such exhaust gases, which may also be used in conjunction with the device 10 to provide an overall system for such treatment. Further described are various versions of different aspects of the device 10 and system, including the liquid bath 18 used with the device 10, methods for manufacturing the liquid bath 18, and methods for treating exhaust gases using such liquid bath 18.

Referring now to FIGS. 1–3, a version of a device 10 is shown for treating exhaust gases. The device 10 comprises a chamber 12 having an intake pipe 14 and an exhaust pipe 16 connected thereto. In the chamber 12 is a reservoir 17 containing a liquid bath 18 through which exhaust gas entering the chamber 12 passes between the intake pipe 14 and the exhaust pipe 16. Means may be provided for specifically directing the flow of the exhaust gas through the reservoir 17 and liquid bath 18 as desired. In one version, such means directs the exhaust gas into and out of the liquid bath 18 in several locations in the chamber 12, such as through a series of bath compartments 20 defined by a baffle system 90 in the chamber 12. By passing through the liquid bath 18, the exhaust gas is treated to remove various exhaust products, such as carbon monoxide, nitrous compounds, and sulfous compounds. In one version, the liquid bath 18 comprises a solution of one or more organic solvents configured for removing exhaust products from the exhaust gas as the gas passes through the reservoir 17 and the liquid bath 18 between the intake pipe 14 to the exhaust pipe 16.

The device 10 may also be configured to reduce the noise level produced by an internal combustion engine with which the device 10 may be used, by outfitting it with one or more resonators 28. In one version, a first resonator 28 is provided within the chamber 12 adjacent to the intake pipe 14. Exhaust gases are directed through the first resonator 28 after passing through the intake pipe 14, prior to being directed through the chamber 12 and into and out of the liquid bath 18. In other versions, a second or end resonator 28 is provided within the chamber 12 adjacent to the exhaust pipe 16. Exhaust gases are directed through the second resonator 28 after passing through the liquid bath 18, prior to exiting the chamber 12 through the exhaust pipe 16. In yet other versions, the device 10 may be provided with one or both of said first and second resonators 28 as described herein.

The device 10 may be outfitted with a scrubber compartment 32 for condensing and collecting liquid bath 18 that may be dissolved or adsorbed into the exhaust gas as it flows through the reservoir 17 in the chamber 12. The level of the liquid bath 18 in the reservoir 17 is thereby prevented from dropping substantially over short term use of the device 10. In one version, the scrubber compartment 32 comprises a plurality of corrugated droplet retainers 34 configured to receive condensate of liquid bath 18 from the exhaust gas. In other versions, the scrubber compartment 32 further comprises a droplet reservoir 36 for collecting the condensate built up on the droplet retainers 34. In yet other versions, the droplet reservoir 36 is in fluid communication with the reservoir 17.

Any suitable means may be employed for directing the flow of exhaust gas into and out of the reservoir 17 in the chamber 12. In one version, such means comprises a baffle system 90 with a plurality of baffles 22, 24 directing flow through a plurality of bath compartments 20 defined by the baffles 22, 24 in the interior of the chamber 12. In other versions, each bath compartment 20 is defined by alternating lower baffle plates 22 and upper baffle plates 24. The lower baffle plates 22 extend generally upwardly from a bottom portion of the chamber 12 toward a top portion of the chamber 12, defining a gas clearance 37 between a distal end 35 of the lower baffle plate 22 and the top portion of the chamber 12. Upper baffle plates 24 extend generally downwardly from the top portion of the chamber 12 toward the bottom portion of the chamber 12. A distal end 35 of each upper baffle plate 34 extending substantially into the reservoir 17 and defining a bath clearance 37 between such distal end 35 and the bottom portion of the chamber 12.

In yet other versions, adjacent bath compartments 20 are fluidly interconnected through the gas clearances 37 and/or the bath clearances 37. In this way, the flow of exhaust gas travels progressively (1) through gas clearances 37 into a bath compartment 20 and the portion of the liquid bath 18 contained in such bath compartment 20, (2) through the bath compartment 20 and the corresponding bath clearance 37 into the portion of the reservoir 17 contained in the next adjacent bath compartment 20, (3) out of such portion of the reservoir 17, and (4) up through the gas clearance 37 into the next adjacent bath compartment 20, and so on.

In one version, each lower baffle plate 22 is secured to the bottom portion of the chamber 12 in a way that defines an aperture 31 through which liquid bath 18 may flow. As a result, the bath compartments 20 having liquid bath 18 are all fluidly interconnected by either bath clearances 37 or apertures 31 in the lower baffle plates 22 in order to maintain a generally equal level of the liquid bath 18 throughout the chamber 12.

During the course of use of the device 10, it is conceivable that the level of the liquid bath 18 may fluctuate, such as by liquid bath 18 escaping with exhaust gas out the exhaust pipe 16, by evaporation, or by other means. As a result, in one version, means for indicating the level of the liquid bath 18 within the chamber 12 may be provided with the device 10, as well as means for filling 40 and/or draining 42 the reservoir 17.

In one version, a level sensor 68 is provided with the device 10 that is configured to indicate the level of the liquid bath 18 within the chamber 12. In other versions, the level sensor 68 comprises a dipstick (not shown). In yet other versions, the level sensor 68 comprises an electronic level sensor (not shown). In yet other versions, the level sensor 68 is secured to the top portion of the chamber 12. In yet other versions, the level sensor 68 further comprises a filler cap 40 configured therein for filling the chamber 12 with liquid bath 18. In yet other versions, a drain cock 42 may be secured to the bottom portion of the chamber 12 that is configured for draining liquid bath 18 from the chamber 12.

Also in the course of the use of the device 10, the quantity of activation of the liquid bath 18 in its capacity to remove exhaust products from the exhaust gas as it passes through the liquid bath 18 will likely diminish. The exhaust products removed from the exhaust gas generally are retained within the liquid bath 18, thereby altering the physical properties of the liquid bath 18. As a result, an activation sensor 68 may be provided with the device 10, secured to the chamber 12 and in contact with the liquid bath 18 in order to indicate the remaining capacity of the liquid bath 18 to remove exhaust products from further exhaust gases flowing through the device 10.

An activation sensor 68 may be selected based on the various ways in which the physical properties of the liquid bath 18 are altered as a result of the continued collection and retention of exhaust products removed from the exhaust gases. For example, pressure, temperature, viscosity, and light refraction through the liquid bath 18 will all be altered as more exhaust products are retained in the liquid bath 18. Thus, activation sensors 68 corresponding to any one or a combination of any of these physical properties may be utilized and calibrated according to the effects that changes in these physical properties have on the capacity of liquid bath 18 to continue to remove exhaust products.

In one version, the activation sensor 68 comprises a viscosity measurement device (not shown) configured to measure the viscosity of the liquid bath 18 at any given time. The viscosity measurement device is generally calibrated such that a lower viscosity measurement relative to a standard viscosity measurement for the liquid bath 18 indicates greater remaining capacity of the liquid bath 18 to remove exhaust products. In contrast, a larger viscosity measurement for the liquid bath 18 relative to the standard viscosity generally indicates lower or no remaining capacity of the liquid bath 18 to remove exhaust products. Standard viscosity for the liquid bath 18 is the average viscosity of the liquid bath 18 prior to collecting and retaining exhaust products removed from exhaust gas. Thus, smaller increases in viscosity relative to the standard measurement indicate greater remaining capacity while greater increases indicate lower or no remaining capacity.

Such an activation sensor 68 operates on the principle that as the liquid bath 18 removes and retains more and more exhaust products from exhaust gases passing through the device 10, the weight and density of the liquid bath 18 increases, which corresponds to an increase in the viscosity of the liquid bath 18. Thus, viscosity of the liquid bath 18 is a general indication of the concentration of exhaust products retained within the liquid bath 18.

For versions wherein the liquid bath 18 comprises organic material, the standard viscosity measurement for the liquid bath 18 prior to removal of any exhaust products is about 1 centipoise. The activation sensor 68 is thus configured to indicate moderate remaining capacity of the liquid bath 18 corresponding to viscosity measurements between about 1.5 and about 2 centipoises and low or no remaining capacity of the liquid bath 18 for viscosity measurements about 4 centipoises and greater.

In other versions, the activation sensor 68 comprises a liquid pressure measurement device (not shown) configured to measure pressure within the liquid bath 18 at any given time. The principle utilized in this type of activation sensor 68 relates an increase in pressure to an increase in concentration of exhaust products retained within the liquid bath 18. Thus, for a smaller pressure increase relative to a standard pressure measurement for the liquid bath 18 prior to the removal of any exhaust products, greater remaining capacity is indicated, and for greater pressure increases relative to the standard pressure measurement, lower or no remaining capacity is indicated. For versions wherein the liquid bath 18 comprises organic material, the standard pressure of the liquid bath 18 prior to removal of any exhaust products is about 1 atmosphere. The pressure measurement device used for the activation sensor 68 is thus calibrated to indicate moderate remaining capacity of the liquid bath 18 for pressure measurements between about 1.1 atmospheres and about 2 atmospheres and to indicate low or no remaining capacity for pressure measurements about 2 atmospheres and greater.

In other versions, the activation sensor 68 comprises a temperature gauge (not shown) configured to measure the temperature of the liquid bath 18 at any given time. The principle of operation here is that as the concentration of exhaust products retained in the liquid bath 18 increases, the temperature of the liquid bath 18 correspondingly increases. In this instance, however, consideration must also be given to increases in temperature of the liquid bath 18 caused by the flow of exhaust gas through the liquid bath 18 generally, as well as consideration of the fact that in many instances, the exhaust gases will enter the chamber 12 at an increased temperature level relative to the liquid bath 18. As a result, activation sensors 68 comprising temperature gauges may need to be configured to delay temperature measurements until several minutes after use of the device 10 has begun in order to allow the temperature of the liquid bath 18 to normalize with respect to the flow of exhaust gases therethrough, or to delay temperature measurements until times when the device 10 is at rest, comparing liquid bath 18 temperatures between uses. In any event, activation sensors 68 comprising temperature gauges in one version are calibrated to indicate moderate remaining capacity of the liquid bath 18 for temperature measurements between about 400° F. and about 500° F. and to indicate low or no remaining capacity of the liquid bath 18 to remove additional exhaust products for measurements about 600° F. and greater.

In other versions, the activation sensor 68 comprises a photo sensor device (not shown) configured to measure light refraction through the liquid bath 18 at any given time. In such versions, a lower refraction index generally indicates greater remaining capacity, and a higher refraction index indicates lower or no remaining capacity. This is based on the premise that as the concentration of exhaust products retained in the liquid bath 18 increases, the refraction index of the liquid bath 18 also increases. While in a specific version wherein the liquid bath 18 comprises organic material upper and lower ranges of infraction indexes cannot be specified, the refractive indexes corresponding to bath having moderate remaining capacity and no remaining capacity will be commensurate with the viscosity and temperature measurement above discussed.

In a specific embodiment, the exhaust treatment device 10 comprises a chamber 12 having an intake pipe 14 and an exhaust pipe 16. Chamber 12 in one version is tubular having a diameter from about 6 inches to about 8 inches and a length from about 18 inches to about 30 inches. In another version, the chamber 12 is rectangular in cross-section having a height of about 5 inches and width of about 10 inches and a length from about 18 to about 30 inches. Approximately the bottom half of the chamber 12 is the reservoir 17. The top half of the chamber 12 is free from fluid other than that carried over by the gas flowing through the device 10. End housings 19 are secured to both ends of the chamber 12 to transition between the intake pipe 14 and the exhaust pipe 16. Both the entrance 21 and the exit 23 are openings in the opposite ends of the chamber 12 extending from above the level of the liquid bath 18 in the reservoir 17 to the top of the chamber 12 and from side to side of the chamber 12. The end housings 19 are trapezoidal in having opposite ends 25 and end openings 27. Ends 25 are of the same size as the exhaust pipe 16 and intake pipe 14 to which they are connected. End openings 27 are the same size as the entrance 21 and exit 23 to which they are connected.

The chamber 12 is divided up into eight compartments 20 by a plurality of baffles 22, 24. A portion of those baffles 22 extend from the top of the chamber 12 downwardly and another portion of the baffles 24 extend from the bottom of the chamber 12 upwardly. Intake 14 and its end housing 19 communicate with a first chamber 52 which is devoid of structure. The first chamber 52 is defined by one end of the chamber 12 and a first baffle 29. First baffle 29 has a plurality of circular spaced apart openings (not shown) therein which communicate with a plurality of diffusers 26. There is one opening 30 for each diffuser 26 or resonator 28. The other end of the diffuser 26 is closed by the second baffle 33. The diffuser 26 is shown to be essentially cylindrical having in its cylindrical wall a plurality of spaced apart openings 30 which defuse the gas passing therethrough into the liquid bath 18 in the reservoir 17.

In another version of the chamber 12, resonators 28 may be positioned between the first baffle 29 and an end of the chamber 12 for noise reduction. See FIG. 3.

The first baffle 29 is shown to extend from the top of the chamber 12 to the bottom of the chamber 12 and between the opposite sides of the chamber 12. The second baffle 33 extends from the bottom of the chamber 12 a partial way towards the top of the chamber 12. The second baffle 33 has a distal end 35 which is spaced from the top of the chamber 12 so as to provide an gas clearance 37 through which gas may pass into the third chamber 39. A fourth chamber 54, a fifth chamber 56, a sixth chamber 58, and a seventh chamber 60 follow the third chamber 39. Each of these chambers 39, 54, 56, 58, 60 differs only in how the baffling defines the chamber 12. The third chamber 39, fifth chamber 56 and seventh chamber 60 are each defined by a leading baffle (in reference to the direction of fluid flow) extending upwardly from the bottom of the chamber 12 and a trailing baffle extending downwardly from the top. The fourth 54 and sixth 58 chambers are defined by a leading baffle extending downwardly from the top of the chamber 12 and a trailing baffle extending upwardly from the bottom of the chamber 12. The trailing baffle in the fourth chamber 54 and the sixth chamber 58 each have an aperture or opening 31 in the baffle adjacent the bottom of the baffle such that each of the chambers 54, 58 having fluid therein are in fluid communication with each other in order to maintain a generally equal level of the liquid bath 18 throughout the chamber 12.

In the final chamber 64 adjacent the opposite end 66 of the chamber 12 there positioned a plurality of scrubber baffles 34 in relatively close proximity to each other with reference to the baffles 29, 33. The scrubber baffles 34 also extend part way upwardly from the bottom of the chamber 12 or part way downwardly from the top of the chamber 12 but are corrugated so as to provide a greater impact surface for the gas flowing through scrubber baffles 34. A first scrubber baffle 34 defines one end of the reservoir 17. The remaining scrubber baffles 34 are not within the reservoir 17 but are only in contact with the exhaust gases and any entrained liquid passing through the scrubber 32 and into the exhaust.

In another version, an end chamber (not shown) may be positioned between the scrubber compartment 32 and the exhaust 16 to hold an exiting resonator 28 therein through which all of the exhaust gasses pass prior to exiting the chamber 12 for noise reduction purposes. See FIG. 3. In one version, the activation sensor 68 is positioned in the fourth chamber 54 and the drain 42 is positioned in the seventh chamber 60. In other versions, the activation sensor 68 and the reservoir drain 42 can be positioned in any of the chambers 70 which form a portion of the reservoir 17. In still other versions, various activation sensors 68 may be positioned in different chambers 70 of the reservoir 17.

The liquid bath 18 generally comprises a solution of one or more organic solvents capable of removing the exhaust products as the exhaust gas passes through the liquid bath 18. The removal process may be by dissolution of the exhaust products by the solvents in the liquid bath 18 as the gas passes through, or by absorption by the exhaust products into the liquid bath 18 by physical or chemical reaction with the solvent. The effectiveness of the removal may be enhanced by increasing the number of bath compartments 20 in the chamber 12, increasing the surface area of the contact surfaces for the reservoir 17 within the chamber 12, at which surfaces the exhaust gas enters or exits the reservoir 17 in each bath compartment 20 or a combination thereof, or any other configuration within the chamber 12 capable of enhancing the removal of exhaust products from the exhaust gases.

In one version, the liquid bath 18 comprises a solution of hydrocarbon compounds, including compounds having one or both of aromatic and aliphatic structures. The aromatic and/or aliphatic compounds may be provided as desired.

In other versions, a liquid hydrocarbon bath 18 comprises a plurality of short chained alkane fragments. One method of preparing such a liquid hydrocarbon bath 18 comprises the steps of heating an asphaltic impregnate to between about 450 degrees Fahrenheit and about 510 degrees Fahrenheit, extracting fumes from the heated impregnate into a first chamber (not shown) and preventing the fumes from escaping from the first chamber, then passing the fumes to a second chamber (not shown), and cooling the second chamber sufficiently to condense the fumes within the second chamber. The condensate of the fumes or distillate is then decanted from the second chamber and collected for use in an exhaust gas treatment device 10.

The exhaust gas treatment device 10 described herein provides a version of a device 10 for removing, among other things, carbon monoxide from exhaust gases and from an operating internal combustion engine. Generally, the method for such removal comprises the steps of passing the exhaust gas through a liquid hydrocarbon bath 18 in a series of bath chambers 20, and expelling the exhaust gas into the atmosphere. In one version, exhaust gases from an internal combustion engine leave the engine combustion unit at a temperature higher than the flashpoint of the liquid hydrocarbon bath 18 used in the device 10. As a result, it may be necessary to add the step of cooling the exhaust gas to an acceptable temperature below the flashpoint of such liquid bath 18. In another version, the exhaust gas is cooled down to between about 300 degrees Fahrenheit and about 600 degrees Fahrenheit. In yet other versions, the exhaust gas is cooled down to at least 400 degrees Fahrenheit. In yet other versions, the method of removal may additionally include the step of passing the bathed exhaust gas through one or a combination of at least one resonator 28 and a scrubber 32 and a droplet retainer 34 configured to condense and collect any of the liquid hydrocarbon bath 18 that may have dissolved in the exhaust gases as it passes through the bath chambers 20.

Any additional cooling step may be performed using a thermal reducer 80, including such a thermal reducer 80 as is described herein. The liquid hydrocarbon bath 18 in other versions comprises a plurality of short chained alkane fragments condensed from fumes collected from a heated asphaltic impregnate.

As previously indicated, it may be desirable to employ a liquid bath 18 comprising a solution of liquid hydrocarbon compounds. In many instances, such a solution may have a low flashpoint relative to the temperature of exhaust gases from an internal combustion engine. Considering that exhaust gases exiting the combustion chamber of an internal combustion engine at elevated temperatures, often approximately 1800 degrees Fahrenheit, it may be necessary to cool the exhaust gases prior to their flow into the intake pipe 14 of the exhaust gas treatment device 10. In one version, exhaust gases are cooled down to between about 300 degrees and 600 degrees Fahrenheit. In other versions, the exhaust gases are cooled down at least below the flashpoint of the liquid bath 18 actually used in the device 10. In yet other versions, a thermal reducer 80 is utilized to cool the exhaust gases exiting from the internal combustion engine.

Referring now to FIGS. 3–5, a version of a thermal reducer 80 is shown for cooling a primary fluid such as exhaust gases. The thermal reducer 80 may be used in conjunction with an exhaust gas treatment device 10 as has been described herein or for other applications for cooling a primary fluid.

In one version, the thermal reducer 80 comprises a cooling chamber 86 having an intake 96 and an exhaust 98 connected thereto at generally opposite ends thereof, a coolant jacket 88 in contact with an external surface 84 of said cooling chamber 86, the external surface 84 or thermal exchange boundary 84. Heat from the primary fluid flowing through the cooling chamber 86 is transferred across the thermal exchange boundary 84 to a coolant flowing through the coolant jacket 88. The coolant jacket 88 in one version has a coolant inlet port 100 and coolant outlet port 102 connected thereto, and means 92 for directing coolant fluid through substantially all of the coolant jacket 88 between the coolant inlet port 100 and the coolant outlet port 102.

In other versions, the cooling chamber 86 comprises a baffle system 90 for directing exhaust gas flowing through the cooling chamber 86 in a way that optimizes the duration of the flow of the exhaust gas in proximity to the thermal exchange boundary 84 of the cooling chamber 86. In other versions, such a baffle system 90 comprises a spiral baffle 91 as shown in FIG. 4.

Referring now to FIGS. 4 and 5, means for directing coolant through substantially all of the coolant jacket 88 in one version comprises a coolant baffle 92 configured to direct coolant axially along the thermal exchange boundary 84 of the cooling chamber 86 back and forth through a plurality of interconnected chambers 104 extending longitudinally of the cooling jacket 88. See FIG. 5. In other versions, the coolant baffle 92 comprises a spiral baffle 91 directing coolant progressively through the coolant jacket 88 in a clockwise or counterclockwise fashion around one side of the thermal exchange boundary 84. See FIG. 4. In yet other versions, the first and second sets (not shown) extend longitudinally of thermal reducer 80 from the coolant inlet port, ultimately leading to the coolant outlet port 102.

In a specific embodiment, the thermal reducer 80 comprises an outer cylindrical shell 82 and a thermal exchange boundary 84 or internal cylindrical shell 84 which are coaxially positioned with respect to each other defining an internal exhaust gas passageway 86 or cooling chamber 86 and an external cooling jacket 88 or passage 88 between the shells 82 and 84. In one version, the internal exhaust gas passageway 86 has a baffle system 90 in the form of a spiral baffle 91 filling the passage so that the gas passing therethrough is always directed toward the internal shell 84 which is the thermal exchange boundary 84 of the thermal reducer 80. In another version, the internal shell 84 is devoid of structure and thus, the gas passageway 86 is a cylindrical tube through which gas passes. Similarly, in one version the cooling passage 88 is provided with a plurality of fins 92 which extend from one end to the other to cause the cooling fluid to pass therebetween longitudinally of the thermal reducer 80. In other versions, the cooling passage 88 is devoid of structure or is filled with a spiral fin 92 between the shells 82 and 84 in order to circulate the cooling liquid from end to end of the thermal reducer 80 and to maintain the cooling liquid at reasonably constant temperature throughout its passage through the thermal reducer 80.

Thermal reducer 80 is provided with end caps 94 which close off the ends of the shell 82 and 84. End caps 94 each have an opening therein into which the inlet 96 or the exit 98 is positioned and secured. The end caps 94 close off the opposite ends of the cooling passage 88. The cooling passage 88 is provided with an inlet 100 and an exit 102 through which the cooling fluid passes into the cooling passage 88 and out of the cooling passage 88 after it has traveled the entire length of the thermal reducer 80.

In a specific water cooled embodiment, the outer shell 82 is from about 3 to 7 inches in diameter and extends from about 18 to about 32 inches long. The interior shell 84, gas passages 86, cooling passage 88, the spiral 91, the fins 92, end caps 94 are each sized accordingly. In a specific embodiment, the cooling liquid utilized with thermal reducer 80 may be water, glycol or combinations thereof or refrigerant mixers such as Freon. When using Freon, the size of thermal reducer 80 may be reduced. In a specific embodiment, utilizing Freon as the coolant fluid, the thermal reducer 80 in a specific embodiment may have diameter and length less than the above disclosed water cooled exhaust.

FIG. 3 illustrates the thermal reducer 80 and the device 10 connected together in an automotive version. Following the device 10 may, in some versions, include a conventional muffler for noise reduction. In such versions, the cooling fluid for use in the thermal reducer 80 may either be water or glycol mixture cooled by the radiator in the conventional engine coolant system or the refrigerant from the vehicle air conditioning system.

In one version, the thermal reducer 80 comprises a cylindrical configuration having an internal shell 84 which comprises the thermal exchange boundary 84, and an outer shell 82. The internal shell 84 and the outer shell 82 define the coolant jacket 88. In one version, there may be a plurality of radially extending axial fins 92 connecting the internal shell 84 to the outer shell 82 and defining interconnected chambers 104 configured for directing coolant in accordance with the coolant baffle system 90.

Figure 6:
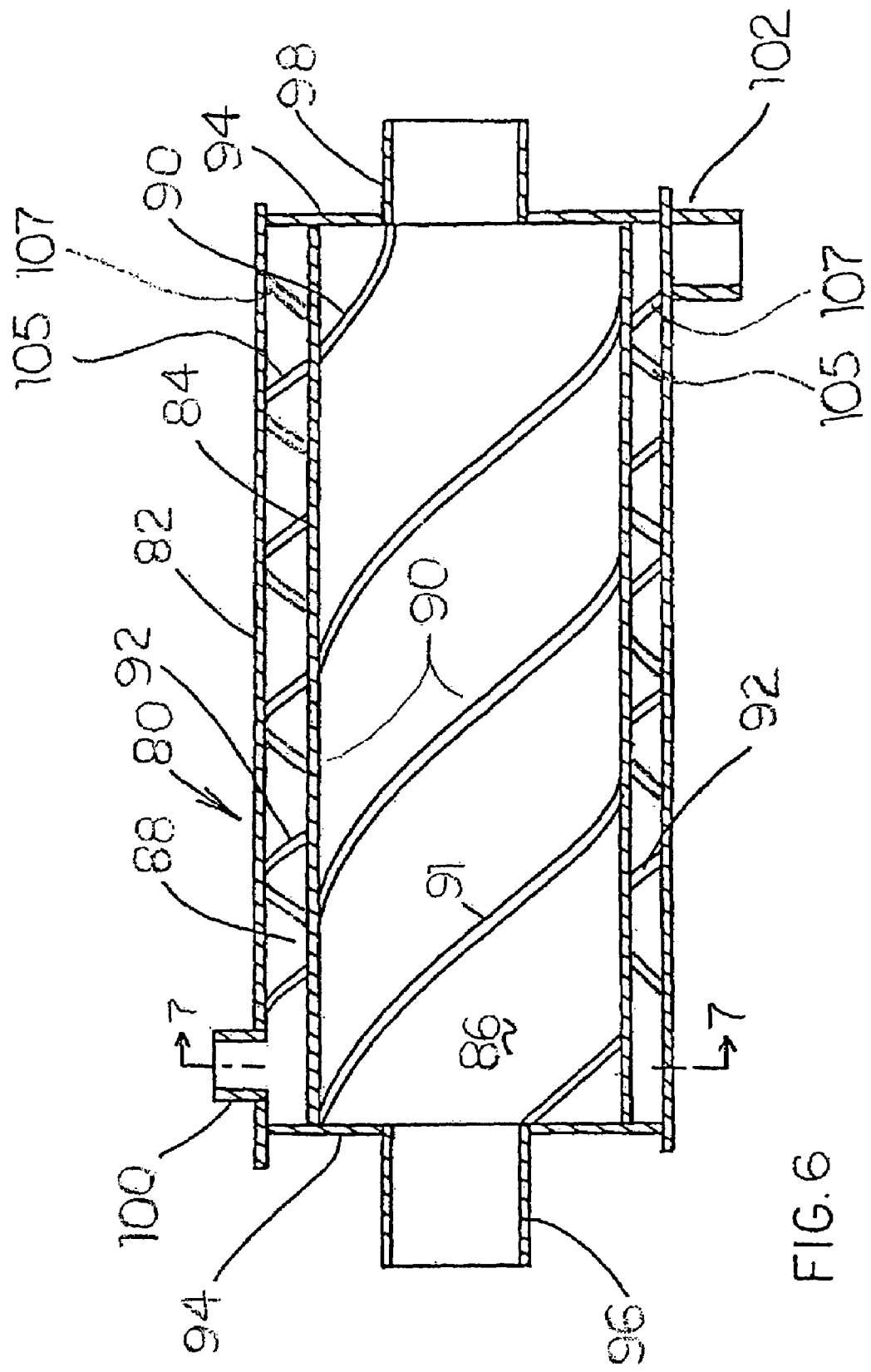
FIG. 6 shows a side view of a version of a cooling chamber for the thermal reducer with the cooling jacket shown in outline.
Figure 7:
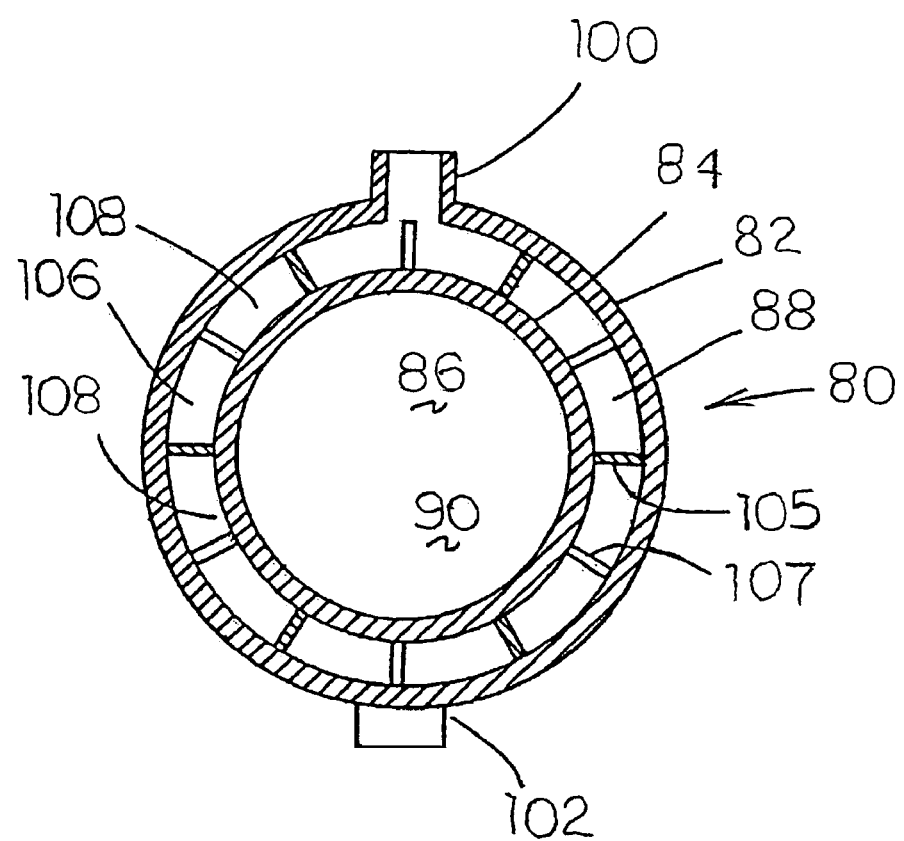
FIG. 7 shows a cross sectional view of a version of the coolant baffle system for a thermal reducer shown along line 7—7 of FIG. 6.

In another version, the thermal reducer 80 comprises a cylindrical configuration have an internal shell 84 which comprises the thermal exchange boundary, and an outer shell 82. The internal shell 84 and the outer shell 82 define the coolant jacket 88. As depicted in FIGS. 6–7, there may be a plurality of radially extending fins 105, 107 which create two sets of interconnected chambers 106, 108. In one version, the chambers 106 are all interconnected. In another version, the chambers 108 are all interconnected. In yet another version, the chambers 106 and 108 are all interconnected. In still another embodiment, the chambers 106 are not interconnected with the chambers 108. The first set of fins 105 directs the coolant through the first set of chambers 106 in a counterclockwise direction around the external surface 84. The second set of fins 107 directs the coolant through the chambers 108 in a clockwise direction around the external surface 84. In this version, the sets of extended fins 105, 107 may direct the flow of coolant to diverge upon entering at the coolant inlet port 100 and converge upon exiting at the coolant outlet port 102.

In one version, the coolant fluid type is selected in accordance with the temperature differential required for the exhaust gas traveling through the 86 corresponding to the size of the cooling chamber 86, the size of the coolant jacket 88, the surface area of the thermal exchange boundary 84, and the flow rates of the exhaust gas through the cooling chamber 86 and the coolant through the coolant jacket 88. In other versions, the coolant fluid is selected from the group consisting of water, glycol, alcohol, and combinations thereof. In yet other versions, the coolant is provided from a distinct cooling system (not shown), the thermal reducer 80 being connected in series to the distinct cooling system. In yet other versions, the distinct cooling system comprises the cooling system (not shown) used in conjunction with an internal combustion engine, such as the coolant loop (not shown) provided in an automobile.

As described above, a thermal reducer 80 may be required to be utilized in conjunction with an exhaust gas treatment device 10 in circumstances in which the liquid bath 18 utilized has a relatively low flashpoint compared to the temperature of the exhaust gas as it exits an internal combustion engine. As a result, the combined thermal reducer 80 and exhaust gas treatment device 10 comprises an exhaust gas treatment system (not shown) provided for removing exhaust products from exhaust gases. Such an exhaust gas treatment system may be employed to perform the method of removing carbon monoxide and other exhaust products from exhaust gases, as described above.

While several versions have been disclosed herein, it is to be understood that the versions and variations shown and described are merely illustrative of the principles of the invention and that various modifications may be implemented by those skilled in the art without departing from the scope and spirit of the invention and the claims appended hereto:

What is claimed is:

1. An exhaust gas treatment device comprising: a chamber having an intake pipe and an exhaust pipe connected thereto, said chamber having a reservoir of liquid bath contained therein and first means for directing exhaust gas entering said chamber through said intake pipe into and out of said liquid bath in a series of locations in said chamber, and ultimately out of said chamber through said exhaust pipe, said liquid bath comprising a solution of one or more organic solvents configured to remove exhaust products from said exhaust gas as a result of being directed through said liquid bath further comprising a scrubber compartment between said liquid bath and said exhaust pipe, said scrubber compartment comprising a plurality of corrugated droplet retainers for receiving condensate of any said liquid bath dissolved or adsorbed into said exhaust gas, said scrubber compartment further comprising a droplet reservoir for collecting said condensate.

2. The device of claim 1 further comprising a first resonator provided within said chamber adjacent said intake pipe, said exhaust gas being directed through said first resonator prior to being directed by said first means.

3. The device of claim 1 further comprising a second resonator provided within said chamber adjacent said exhaust pipe, said exhaust gas being directed through said second resonator prior to exiting out of said chamber through said exhaust pipe.

4. The device of claim 1 further comprising an end resonator provided within said chamber adjacent said exhaust pipe, said exhaust gas being directed through said end resonator prior to exiting out of said chamber through said exhaust pipe.

5. The device of claim 1 wherein said liquid bath comprises a solution of hydrocarbon compounds, said compounds comprising organic structures of one or both of aromatic and aliphatic compounds.

6. The device of claim 1 wherein said first means comprises a baffling system, said system comprising a plurality of baffles directing a flow of said exhaust gas into and out of said liquid bath through a plurality of bath compartments defined by said baffles in the interior of said chamber.

7. The device of claim 6 wherein each said bath compartment is defined by alternating lower baffle plates and upper baffle plates, said lower baffle plates extending generally upwardly from a bottom portion of said chamber toward a top portion of said chamber and defining a gas clearance between a distal end of said lower baffle plate and said top portion, said upper baffle plates extending generally downwardly from said top portion toward said bottom portion, a distal end of each said upper baffle plate extending substantially into said reservoir of said bath and defining a bath clearance between said distal end of said upper baffle plate and said bottom portion.

8. The device of claim 7 wherein adjacent bath compartments are interconnected through one of said gas clearances or one of said bath clearances.

9. The device of claim 1 further comprising a level sensor configured to indicate the level of said reservoir of said liquid bath within said chamber.

10. The device of claim 9 wherein said level sensor comprises a dipstick.

11. The device of claim 9 wherein said level sensor comprises an electronic level sensor.

12. The device of claim 9 wherein said level sensor is secured to a top portion of said chamber.

13. The device of claim 9 wherein said level sensor further comprises a filler cap configured for filling said chamber with said liquid bath.

14. The device of claim 9 further comprising a drain cock secured to a bottom portion of said chamber configured for draining said liquid bath from said chamber.

15. The device of claim 1 further comprising a drain cock secured to a bottom portion of said chamber configured for draining said liquid bath from said chamber.

16. The device of claim 1 further comprising an activation sensor secured to said chamber and in contact with said liquid bath, said activation sensor configured to indicate remaining capacity of said liquid bath to remove said exhaust products.

17. The device of claim 16 wherein said activation sensor comprises a viscosity measurement device configured to measure viscosity of said liquid bath at any given time, wherein a smaller viscosity increase relative to a standard viscosity measurement for said liquid bath indicates greater remaining capacity and a greater viscosity increase relative to a standard viscosity measurement for said liquid bath indicates lower or no remaining capacity.

18. The device of claim 17 wherein standard viscosity of said liquid bath prior to removal of any said exhaust products is about 1 centipoise, said activation sensor configured to indicate viscosity measurements between about 1½ and about 2 centipoises as moderate remaining capacity and measurements about 4 centipoises and greater as having low or no remaining capacity.

19. The device of claim 17 wherein said activation sensor comprises a liquid pressure measurement device configured to measure pressure within said liquid bath at any given time, wherein a smaller pressure increase relative to a standard pressure measurement for said liquid bath indicates greater remaining capacity and a greater pressure increase relative to a standard pressure measurement for said liquid bath indicates lower or no remaining capacity.

20. The device of claim 19 wherein said standard pressure of said liquid bath prior to removal of any said exhaust products is about 1 atmosphere, said activation sensor configured to indicate pressure measurements between about 1 atmosphere and about 2 atmospheres as moderate remaining capacity and measurements about 2 atmospheres and greater as having low or no remaining capacity.

21. The device of claim 16 wherein said activation sensor comprises a temperature gauge configured to measure temperature of said liquid bath at any given time.

22. The device of claim 21 wherein said activation sensor is configured to indicate temperature measurements between about 400° F. and about 500° F. as moderate remaining capacity and measurements about 600° F. and greater as having low or no remaining capacity.

23. The device of claim 16 wherein said activation sensor comprises a photo sensor device configured to measure light refraction through said liquid bath at any given time, wherein a lower refraction index indicates greater remaining capacity and a higher refraction index indicates lower or no remaining capacity.

24. The device of claim 1 further comprising a thermal reducer having: a cooling chamber with an intake and an exhaust connected thereto at opposite ends thereof, a coolant jacket in contact with an external surface of said cooling chamber, said external surface comprising a thermal exchange boundary, said jacket having a coolant inlet port and coolant outlet port connected thereto and means for directing coolant through substantially all of said jacket between said coolant inlet port and said coolant outlet port.

25. The thermal reducer of claim 24 wherein said cooling chamber comprises a baffle system for directing exhaust gas flowing through said cooling chamber.

26. The thermal reducer of claim 25 wherein said baffle system comprises a spiral baffle.

27. The thermal reducer of claim 25 wherein said means for directing coolant comprises a coolant baffle configured to direct coolant axially along said external surface through a plurality of interconnected chambers positioned circumferentially about said external surface.

28. The thermal reducer of claim 24 wherein said coolant is selected from the group consisting of water, glycol, alcohol, and combinations thereof.

29. The thermal reducer of claim 26 wherein said coolant is provided from a distinct cooling system, said thermal reducer being connected in series to said distinct cooling system.

30. The thermal reducer of claim 29 wherein said distinct cooling system comprises a cooling system used in conjunction with an internal combustion engine.

31. The device of claim 1 wherein said liquid bath comprises a liquid hydrocarbon bath for treatment of exhaust gases comprising a plurality of short chained alkane fragments condensed from fumes collected from heated asphaltic impregnates.

32. The device of claim 1 wherein said liquid bath comprises a combination of short chain alkanes.

33. The device of claim 1 wherein said liquid bath comprises a plurality of short chain alkanes fragments condensed from fumes collected from heated asphaltic impregnates.

34. An exhaust gas treatment system comprising: a thermal reducer connected to an exhaust gas treatment device, said thermal reducer comprising a cooling chamber having an intake and an exhaust connected thereto at opposite ends thereof, a coolant jacket in contact with an external surface of said cooling chamber, said external surface comprising a thermal exchange boundary, said jacket having a coolant inlet port and a coolant outlet port connected thereto and means for directing coolant through substantially all of said jacket between said coolant inlet port and said coolant outlet port, said exhaust gas treatment device comprising a chamber having an intake pipe and an exhaust pipe connected thereto, said intake pipe being communicatively connected to said exhaust of said thermal reducer, said chamber having a reservoir of liquid bath contained therein and first means for directing exhaust gas entering said chamber through said intake pipe into and out of said liquid bath in a series of locations in said chamber, and out of said chamber through said exhaust pipe, said liquid bath comprising a solution of one or more organic solvents configured to remove exhaust products from said exhaust gas as a result of being directed through said liquid bath, said exhaust gas entering said intake of said thermal reducer from an internal combustion engine, further comprising a scrubber compartment between said liquid bath and said exhaust pipe, said scrubber compartment comprising a plurality of corrugated droplet retainers for receiving condensate of any said liquid bath dissolved or absorbed into said exhaust gas, said scrubber compartment further comprising a droplet reservoir for collecting said condensate.

35. The device of claim 34 further comprising a first resonator provided within said chamber adjacent said intake pipe, said exhaust gas being directed through said first resonator prior to being directed by said first means.

36. The device of claim 35 further comprising a second resonator provided within said chamber adjacent said exhaust pipe, said exhaust gas being directed through said second resonator prior to exiting out of said chamber through said exhaust pipe.

37. The device of claim 34 further comprising an end resonator provided within said chamber adjacent said exhaust pipe, said exhaust gas being directed through said end resonator prior to exiting out of said chamber through said exhaust pipe.

38. The device of claim 34 wherein said liquid bath comprises a solution of hydrocarbon compounds, said compounds comprising organic structures of one or both of aromatic and aliphatic compounds.

39. The device of claim 34 wherein said first means comprises a baffling system, said system comprising a plurality of baffles directing a flow of said exhaust gas into and out of said liquid bath through a plurality of bath compartments defined by said baffles in the interior of said chamber.

40. The device of claim 39 wherein each said bath compartment is defined by alternating lower baffle plates and upper baffle plates, said lower baffle plates extending generally upwardly from a bottom portion of said chamber toward a top portion of said chamber and defining a gas clearance between a distal end of said lower baffle plate and said top portion, said upper baffle plates extending generally downwardly from said top portion toward said bottom portion, a distal end of each said upper baffle plate extending substantially into said reservoir of said bath and defining a bath clearance between said distal end of said upper baffle plate and said bottom portion.

41. The device of claim 40 wherein adjacent bath compartments are interconnected through one of said gas clearances or one of said bath clearances.

42. The device of claim 34 further comprising a level sensor configured to indicate the level of said reservoir of said liquid bath within said chamber.

43. The device of claim 42 wherein said level sensor comprises a dipstick.

44. The device of claim 42 wherein said level sensor comprises an electronic level sensor.

45. The device of claim 42 wherein said level sensor is secured to a top portion of said chamber.

46. The device of claim 42 wherein said level sensor further comprises a filler cap configured for filling said chamber with said liquid bath.

47. The device of claim 42 further comprising a drain cock secured to a bottom portion of said chamber configured for draining said liquid bath from said chamber.

48. The device of claim 34 further comprising a drain cock secured to a bottom portion of said chamber configured for draining said liquid bath from said chamber.

49. The thermal reducer of claim 34 wherein said cooling chamber comprises a baffle system for directing exhaust gas flowing through said cooling chamber.

50. The thermal reducer of claim 49 wherein said baffle system comprises a spiral baffle.

51. The thermal reducer of claim 49 wherein said means for directing coolant comprises a coolant baffle configured to direct coolant axially along said external surface through a plurality of interconnected chambers positioned circumferentially about said external surface.

52. The thermal reducer of claim 34 wherein said coolant is selected from the group consisting of water, glycol, alcohol, and combinations thereof.

53. The thermal reducer of claim 34 wherein said coolant is provided from a distinct cooling system, said thermal reducer being connected in series to said distinct cooling system.

54. The thermal reducer of claim 53 wherein said distinct cooling system comprises a cooling system used in conjunction with an internal combustion engine.

55. The device of claim 34 wherein said liquid bath comprises a combination of short chain alkanes.

56. The device of claim 34 wherein said liquid bath comprises a plurality of short chain alkanes fragments condensed from fumes collected from heated asphaltic impregnates.

57. An exhaust gas treatment device comprising: a chamber having an intake pipe and an exhaust pipe connected thereto, said chamber having a reservoir of liquid bath contained therein and first means for directing exhaust gas entering said chamber through said intake pipe into and out of said liquid bath in a series of locations in said chamber, and ultimately out of said chamber through said exhaust pipe, said liquid bath comprising a solution of one or more organic solvents configured to remove exhaust products from said exhaust gas as a result of being directed through said liquid bath, said first means comprising a baffling system, said system having a plurality of baffles directing a flow of said exhaust gas into and out of said liquid bath through a plurality of bath compartments defined by said baffles in the interior of said chamber, each said bath compartment being defined by alternating lower baffle plates and upper baffle plates, said lower baffle plates extending generally upwardly from a bottom portion of said chamber toward a top portion of said chamber and defining a gas clearance between a distal end of said lower baffle plates and said top portion, said upper baffle plates extending generally downwardly from said top portion toward said bottom portion, a distal end of each said upper baffle plates extending substantially into said reservoir of said bath and defining a bath clearance between said distal ends of said upper baffle plates and said bottom portion, each said lower baffle plate being secured to said bottom portion defining an aperture through which said liquid bath may flow, wherein said bath compartments are all interconnected by said bath clearances or said apertures for maintaining a generally equal level of said liquid bath throughout said chamber.

58. A thermal reducer for cooling a primary fluid comprising a cooling chamber having an intake and an exhaust connected thereto at opposite ends thereof, a coolant jacket in contact with an external surface of said cooling chamber, said external surface comprising a thermal exchange boundary, said jacket having a coolant inlet port and coolant outlet port connected thereto and means for directing coolant through substantially all of said jacket between said coolant inlet port and said coolant outlet port, said cooling chamber comprising a baffle system for directing exhaust gas flowing through said cooling chamber, said means for directing coolant comprising a coolant baffle configured to direct coolant axially along said external surface through a plurality of interconnected chambers positioned circumferentially about said external surface, said coolant baffle having two sets of interconnected chambers, a first set directing coolant progressively through said chambers clockwise around said external surface, and a second set directing coolant progressively through said chambers counterclockwise around said external surface.

59. The thermal reducer of claim 58 wherein said first and second sets diverge from said coolant inlet port and converge at said coolant outlet port.

60. An exhaust gas treatment system comprising: a thermal reducer connected to an exhaust gas treatment device, said thermal reducer comprising a cooling chamber having an intake and an exhaust connected thereto at opposite ends thereof, a coolant jacket in contact with an external surface of said cooling chamber, said external surface comprising a thermal exchange boundary, said jacket having a coolant inlet port and a coolant outlet port connected thereto and means for directing coolant through substantially all of said jacket between said coolant inlet port and said coolant outlet port, said exhaust gas treatment device comprising a chamber having an intake pipe and an exhaust pipe connected thereto, said intake pipe being communicatively connected to said exhaust of said thermal reducer, said chamber having a reservoir of liquid bath contained therein and first means for directing exhaust gas entering said chamber through said intake pipe into and out of said liquid bath in a series of locations in said chamber, and out of said chamber through said exhaust pipe, said liquid bath comprising a solution of one or more organic solvents configured to remove exhaust products from said exhaust gas as a result of being directed through said liquid bath, said exhaust gas entering said intake of said thermal reducer from an internal combustion engine, further comprising a scrubber compartment between said liquid bath and said exhaust pipe, said scrubber compartment comprising a plurality of droplet retainers for receiving condensate of any said liquid bath dissolved or absorbed into said exhaust gas, said scrubber compartment further comprising a droplet reservoir for collecting said condensate, said first means comprising a baffling system, said system having a plurality of baffles directing a flow of said exhaust gas into and out of said liquid bath through a plurality of bath compartments defined by said baffles in the interior of said chamber, each said bath compartment being defined by alternating lower baffle plates and upper baffle plates, said lower baffle plates extending generally upwardly from a bottom portion of said chamber toward a top portion of said chamber and defining a gas clearance between a distal end of said lower baffle plates and said top portion, said upper baffle plates extending generally downwardly from said top portion toward said bottom portion, a distal end of each said upper baffle plates extending substantially into said reservoir of said bath and defining a bath clearance between said distal ends of said upper baffle plates and said bottom portion, each said lower baffle plate being secured to said bottom portion defining an aperture through which said liquid bath may flow, wherein said bath compartments are all interconnected by said bath clearances or said apertures for maintaining a generally equal level of said liquid bath throughout said chamber.

61. An exhaust gas treatment system comprising: a thermal reducer connected to an exhaust gas treatment device, said thermal reducer comprising a cooling chamber having an intake and an exhaust connected thereto at opposite ends thereof, a coolant jacket in contact with an external surface of said cooling chamber, said external surface comprising a thermal exchange boundary, said jacket having a coolant inlet port and a coolant outlet port connected thereto and means for directing coolant through substantially all of said jacket between said coolant inlet port and said coolant outlet port, said exhaust gas treatment device comprising a chamber having an intake pipe and an exhaust pipe connected thereto, said intake pipe being communicatively connected to said exhaust of said thermal reducer, said chamber having a reservoir of liquid bath contained therein and first means for directing exhaust gas entering said chamber through said intake pipe into and out of said liquid bath in a series of locations in said chamber, and out of said chamber through said exhaust pipe, said liquid bath comprising a solution of one or more organic solvents configured to remove exhaust products from said exhaust gas as a result of being directed through said liquid bath, said exhaust gas entering said intake of said thermal reducer from an internal combustion engine, further comprising an activation sensor secured to said chamber and in contact with said liquid bath, said activation sensor configured to indicate the remaining capacity of said liquid bath to remove said exhaust products.

62. The device of claim 61 wherein said activation sensor comprises a viscosity measurement device configured to measure viscosity of said liquid bath at any given time, wherein a smaller viscosity increase relative to a standard viscosity measurement for said liquid bath indicates greater remaining capacity and a greater viscosity increase relative to a standard viscosity measurement for said liquid bath indicates lower or no remaining capacity.

63. The device of claim 61 wherein standard viscosity of said liquid bath prior to removal of any said exhaust products is about 1 centipoise, said activation sensor configured to indicate viscosity measurements between about 1½ and about 2 centipoises as moderate remaining capacity and measurements about 4 centipoises and greater as having low or no remaining capacity.

64. The device of claim 61 wherein said activation sensor comprises a liquid pressure measurement device configured to measure pressure within said liquid bath at any given time, wherein a smaller pressure increase relative to a standard pressure measurement for said liquid bath indicates greater remaining capacity and a greater pressure increase relative to a standard pressure measurement for said liquid bath indicates lower or no remaining capacity.

65. The device of claim 64 wherein said standard pressure of said liquid bath prior to removal of any said exhaust products is about 1 atmosphere, said activation sensor configured to indicate pressure measurements between about 1 atmosphere and about 2 atmospheres as moderate remaining capacity and measurements about 2 atmospheres and greater as having low or no remaining capacity.

66. The device of claim 61 wherein said activation sensor comprises a temperature gauge configured to measure temperature of said liquid bath at any given time.

67. The device of claim 65 wherein said activation sensor is configured to indicate temperature measurements between about 400° F. and about 500° F. as moderate remaining capacity and measurements about 600° F. and greater as having low or no remaining capacity.

68. The device of claim 61 wherein said activation sensor comprises a photo sensor device configured to measure light refraction through said liquid bath at any given time, wherein a lower refraction index indicates greater remaining capacity and a higher refraction index indicates lower or no remaining capacity.

69. An exhaust gas treatment system comprising: a thermal reducer connected to an exhaust gas treatment device, said thermal reducer comprising a cooling chamber having an intake and an exhaust connected thereto at opposite ends thereof, a coolant jacket in contact with an external surface of said cooling chamber, said external surface comprising a thermal exchange boundary, said jacket having a coolant inlet port and a coolant outlet port connected thereto and means for directing coolant through substantially all of said jacket between said coolant inlet port and said coolant outlet port, said exhaust gas treatment device comprising a chamber having an intake pipe and an exhaust pipe connected thereto, said intake pipe being communicatively connected to said exhaust of said thermal reducer, said chamber having a reservoir of liquid bath contained therein and first means for directing exhaust gas entering said chamber through said intake pipe into and out of said liquid bath in a series of locations in said chamber, and out of said chamber through said exhaust pipe, said liquid bath comprising a solution of one or more organic solvents configured to remove exhaust products from said exhaust gas as a result of being directed through said liquid bath, said exhaust gas entering said intake of said thermal reducer from an internal combustion engine, said cooling chamber comprising a baffle system for directing exhaust gas flowing through said cooling chamber, said means for directing coolant comprising a coolant baffle configured to direct coolant axially along said external surface through a plurality of interconnected chambers positioned circumferentially about said external surface, wherein said coolant baffle comprises two sets of interconnected chambers, a first set directing coolant progressively through said chambers clockwise around said external surface, and a second set directing coolant progressively through said chambers counterclockwise around said external surface.

70. The thermal reducer of claim 69 wherein said first and second sets diverge from said coolant inlet port and converge at said coolant outlet port.

* * * * *

UNITED STATES PATENT AND TRADEMARK OFFICE
CERTIFICATE OF CORRECTION

| | |
|---|---|
| PATENT NO. | : 7,192,469 B1 |
| APPLICATION NO. | : 10/884123 |
| DATED | : March 20, 2007 |
| INVENTOR(S) | : Demetrius A. Rumell et al. |

It is certified that error appears in the above-identified patent and that said Letters Patent is hereby corrected as shown below:

Title page of patent (76) Inventors: Replace "Fred A. VanDeVander" with --Fred A. VanDevander--.

Signed and Sealed this

Fifteenth Day of May, 2007

JON W. DUDAS
*Director of the United States Patent and Trademark Office*